(12) United States Patent
Rajagopalan et al.

(10) Patent No.: US 11,256,745 B2
(45) Date of Patent: Feb. 22, 2022

(54) CONTRACT LIBRARY DATA STRUCTURES AND USES THEREOF

(71) Applicant: SAP SE, Walldorf (DE)

(72) Inventors: Nithya Rajagopalan, Bangalore (IN); Sunil Gornalle, Bangalore (IN); Abhishek Chaturvedi, Bangalore (IN); Gurudayal Khosla, Bangalore (IN); Prasad Karani, Karnataka (IN); Surendranath Gopinathan, Bangalore (IN); Panish Ramakrishna, Bangalore (IN)

(73) Assignee: SAP SE, Walldorf (DE)

( * ) Notice: Subject to any disclaimer, the term of this patent is extended or adjusted under 35 U.S.C. 154(b) by 327 days.

(21) Appl. No.: 16/434,363

(22) Filed: Jun. 7, 2019

(65) Prior Publication Data
US 2020/0387542 A1 Dec. 10, 2020

(51) Int. Cl.
*G06F 16/901* (2019.01)
*G06K 9/62* (2006.01)
*G06F 16/903* (2019.01)

(52) U.S. Cl.
CPC ...... *G06F 16/901* (2019.01); *G06F 16/90335* (2019.01); *G06K 9/6267* (2013.01)

(58) Field of Classification Search
CPC ............ G06F 16/901; G06F 16/90335; G06K 9/6267; G06K 9/6268
See application file for complete search history.

(56) References Cited

U.S. PATENT DOCUMENTS

| | | | |
|---|---|---|---|
| 2015/0066552 A1* | 3/2015 | Shami | G06Q 10/0631 705/7.12 |
| 2017/0061257 A1* | 3/2017 | Yang | G06K 9/6267 |
| 2017/0206326 A1* | 7/2017 | Klein | G06Q 40/08 |

* cited by examiner

*Primary Examiner* — Cam Y T Truong
(74) *Attorney, Agent, or Firm* — Schwegman Lundberg & Woessner, P.A.

(57) ABSTRACT

Various examples are directed to systems and methods for generating a contract form using a contract library data structure. A computing device may receive, from a user, a contract form request comprising a set of contract classifiers. The computing device may access a contract library data structure and executes a filter routine to traverse the contract library data structure to identify at least one contract term associated with one or more filter tags corresponding to the set of contract classifiers. The filter routine may return an indication of the first contract term associated with the first node. The computing device may generate a contract form comprising the first contract term.

20 Claims, 9 Drawing Sheets

CONTRACT LIBRARY DATA STRUCTURES AND USES THEREOF

TECHNICAL HELD

This document generally relates to methods and systems for use with computer networks. More particularly, this document relates to ways of configuring and operating computing devices using the described contract library data structures to generate contract forms.

BACKGROUND

Databases are used in many different computer processing environments to store data, often in a structured and easily-accessible way. Many databases are managed by database management systems that execute database operations received from users. In some examples, a database management system identifies a database record or records matching a user search request. desires to identify a particular record from a database table.

BRIEF DESCRIPTION OF DRAWINGS

The present disclosure is illustrated by way of example and not limitation in the following figures.

DETAILED DESCRIPTION

Figure 1:
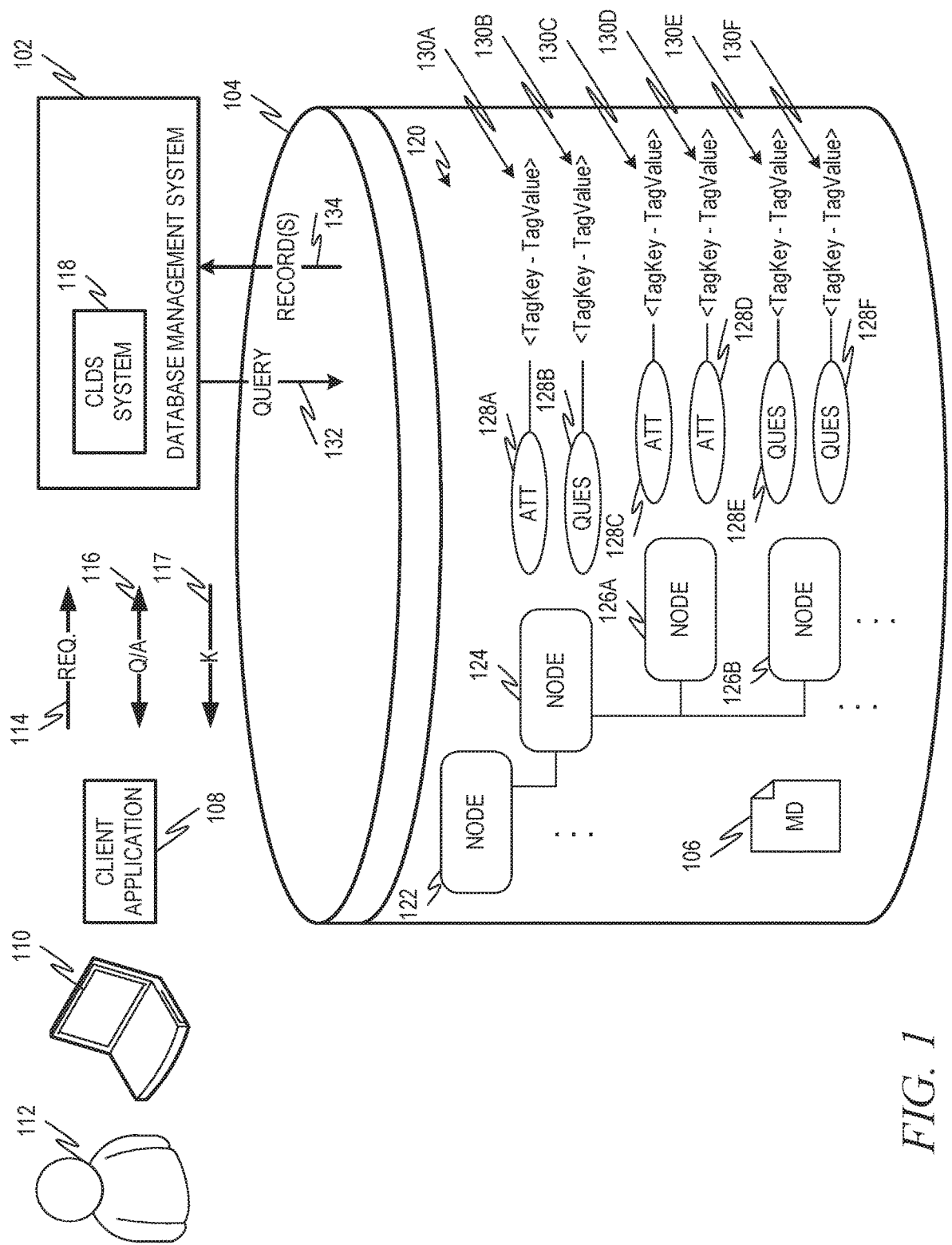
FIG. 1 is a diagram showing one example of an environment generating at least one contract form using a contract library data structure.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Databases and similar storage schemes are used by computing devices to store many different kinds of data including data describing contracts or other business operations. In some examples, a database is used to store data describing contracts entered into by a business entity. For example, the database can be used to store collections of contracts and/or contract terms. When a user of the database generates a new contract, it is desirable for the user to benefit from historical contract data stored at the database. For example, when generating a contract form, a user may desire to benefit from knowledge of contract terms used in similar contracts in past situations. The user could scan the database to retrieve previous contracts for study and/or reference.

Retrieving and scanning previous contracts, however, can be time consuming and inefficient. Further, even when performed by a human user, scanning previous contracts to select terms for a new contract is a difficult task that is fraught with potential errors. For example, it may not be immediately apparent to a human user why a particular term was included on a contract or why another term was omitted. Without this knowledge, there is a risk that the human user will include unnecessary or even disadvantageous terms in the new contract or omit terms that may be desirable for the user's situation but were not for the reviewed contracts.

In this context, computers suffer from limitations similar to those of humans. For example, a computerized system can retrieve a previous contract based on keywords or other search criteria describing the user's currently desired contract. Although such a computerized search may be performed faster than a human could, the results suffer defects similar to human-performed searches. For example, unless the computer is skillfully programmed, it is just as liable as a human to pull contracts with terms that are not relevant to user's situation or fail to recognize terms that, while not in example contracts, are desirable for the user's situation.

On difficulty associated with the retrieval and scanning of prior contracts is that contracts can be described by different types of classifiers. For example, a contract can be described by a type (e.g., sales contract, insurance contract, etc.), a jurisdiction (e.g., Germany, California, New York), a supplier a contract party, such as a counter-party, an item or service purchased, etc. When considering a new contract situation, reviewing a contacting having common classifiers of one type may not provide a complete picture. For example, the terms of a contract for a particular item executed in California may include terms that are not helpful and sometimes even harmful to a contract executed in Germany. Continuing the example, the California contract may also lack contract terms that are desirable and, in some examples, necessary for a contract executed in California.

Various examples described herein are directed to systems and methods for using a computerized database to generate a contract form for a user, for example, based on historical contract data stored at the database. A contract form is a data structure including various contract terms. The systems and methods described herein generate and utilize a contract library data structure. The contract library data structure organizes contract terms by different types of contract classifiers and can be used, as described herein, to more effectively and efficiently store and retrieve data related to contract terms.

The contract library data structure includes nodes, where the nodes correspond to contract classifiers of one or more classifier types. The nodes may be related in a hierarchal manner. For example, if the contract library data structure is organized according to a contract classifier type indicating jurisdiction, a first node may correspond to The United States. Child nodes may correspond to particular states (e.g., California, New Jersey, etc.). Consider another example, in which the contract library data structure is organized according to subject item. A first node may correspond to industrial vehicles. A child node of the industrial tool node may correspond to trucks. Child nodes of the truck node may correspond to pick-up trucks, dump trucks, etc. A second child node of the industrial tool node may correspond to grading equipment. Child nodes of the grading equipment node may correspond to backhoes, bulldozers, road graders, and so on.

Nodes of the contract library data structure are associated with one or more contract terms. A contract term is a provision of a contract describing an obligation between the parties. A contract term can be structured as an attribute. An attribute positively describes an obligation between the parties. Example attributes include, a length of the contract (e.g., 3 years), a clause related to employee ownership of intellectual property, etc. Questions describe a contingency between two or more attributes based on a predicate. When a question is included in a contract form, as described herein, the user is prompted to provide an answer to the question. Based on the answer, one or more attributes are suggested and/or added to the contract form. Consider an example question inquiring about whether equipment is for lease or purchase. If the equipment is for lease, an attribute associated with lease terms may be added to the contract form. If the equipment is for purchase, an attribute associated with purchase may be added to the contract form.

Contract terms of the contract library data structure are tagged with pairs of tag keys and tag values. The tags are used, as described herein, to provide an additional dimension of contract classifiers to the data structure and to facilitate updating of the contract library data structure when new contracts are created. For example, some tags are filter tags. A filter tag for a contract term includes an indication of a contract classifier associated with the tagged contract term. When a new contract form is generated, a filter routine executes on the contract library data structure to identify contract terms having the same contract classifiers as the node and the filter tag.

Other tags are handler tags. A handler tag for a contract term points to a contract term handler that executes to update the tags associated with the contract term at the contract library data structure. For example, if contract terms are added to a first contract form (and, in some examples, approved by a user), the contract term handler for that term is called. The contract term handler then identifies other equivalent contract terms (e.g., filed at different positions of the contract library data structure) and adds tags (e.g., filter tags) to those contract terms. The added tag or tags describe the contract classifiers associated with the first contract form.

In this way, the contract library data structure, as described herein, enables the computing device to consider multiple types of contract classifiers simultaneously and return the most relevant contract terms to be included in a contract form. This improves the operation of the computer, for example, by providing more efficient searching and more relevant results. For example, traversing a defined contract library data structure with a filter routine may be more efficient than keyword searching or other suitable search methods. Also, as described herein, utilizing the contract library data structure may return better results than either a manual search or a routine computer-implemented search.

For example, among other advantages, the contract library data structure described herein allows consideration of individual contract terms and also simplifies the consideration of multiple contract classifier types simultaneously.

FIG. 1 is a diagram showing one example of an environment 100 generating at least one contract form 117 using a contract library data structure 120. The environment 100 includes a database management system 102 with a contract library data structure (CLDS) system 118. The database management system 102 is in communication with a client applications 108 that may execute at a client computing device 110.

The database management system 102 manages a database 104 organized according to a database schema. The database schema describes various tables at a database including the columns of the tables and the relationships between the tables. The client application 108 may execute at a client computing device 110. The client computing device 110 may be or include any suitable computing device or combination of computing devices. For example, client computing device 110 may be or include any suitable type of server, laptop computer, desktop computer, tablet computer, mobile computer, etc.

The client application 108 may be associated with a user account or user. In some examples, the user 112 is a human user. In FIG. 1, the example client application 108 is operated by a human user 112. In some examples, the user is non-human (e.g., a software or hardware component). For example, the client application 108 may have a user account with the database management system 102 that does not require human intervention to use. Accordingly, client application 108, in some examples, does not include the user 112 and/or operates independent of the user 112.

The database 104 includes an example contract library data structure 120. The contract library data structure 120 includes nodes 122, 124, 126A, 126B. Nodes 122, 124, 126A, 126B correspond to contract classifiers. In some examples, the contract classifiers associated with the nodes may be of the same contract classifier type. For example, the nodes 122, 124, 126A, 126B may be associated with contract classifiers indicating goods are services that are the subject of a contract. In some examples, the nodes 122, 124, 126A, 126B are associated with different contract classifier types. For example, some nodes 122, 124, 126A, 126B may be associated with jurisdiction classifier types while other nodes 122, 124, 126A, 126B may be associated with goods or services, counter parties, business entities or departments entering the contract, or other contract classifier types.

In the example of FIG. 1, the nodes 122, 124, 126A, 126B are organized in a hierarchal manner. For example, node 124 is a child node of node 122. Nodes 126A and 126B depend from node 124. Consider an example, in which all of the nodes 122, 124, 126A, 126B are associated with goods and services that are the subject of a contract. In this example, the node 122 is associated with a contract classifier "food," indicating contracts for the sale of food. Node 124 is associated with "frozen food," indicating contracts for the sale of frozen food, a sub-type of its parent node 122 associated with food. Node 126A is associated with "pizza," indicating contracts for the sale of frozen pizzas, a sub-type of its parent node 124 associated with frozen food. Node 126B is associated with frozen peas, another sub-type of its parent node 124 associated with frozen food.

Consider another example in which nodes 122 and 124 are associated with contract classifiers of the same contract classifier type and nodes 126A, 126B are associated with different contract classifier types. In this example, nodes 122 and 124 are associated with contract categories. Node 122 is associated with "insurance contracts" and node 124 is associated with "heavy equipment insurance." In this example, however, nodes 126A and 126B are associated with jurisdiction classifier types. For example, node 126A is associated with Germany and node 126B is associated with California.

The various nodes 122, 124, 126A, 126B can also be associated with contract terms 128A, 128B, 128C, 128D, 128E, 128F. In this example, contract terms 128A, 128C, and 128D are associated with attribute contract terms while contract terms 128B, 128E, and 128F are associated with question contract terms. Although two contract terms are shown associated with each node 124, 126A, 126B, nodes can have any suitable number of associated contract terms.

The various contract terms 128A, 128B, 1280, 128D, 128E, 128F can be associated with one or more tags 130A, 130B, 130C, 130D, 130E, 130E, 130F. Tags, in some examples, indicate a tag key (TagKey) and a tag value (TagValue). The tag key refers to metadata 106 that describes tags of the same type as the respective tag 130A, 130B, 130C, 130D, 130E, 130E, 130F. The tag value indicates the name or other parameter of a tag.

The tags 130A, 130B, 1300, 130D, 130E, 130E, 130F can include handler tags and filter tags. Filter tags can refer to one or more entries at the metadata 106 describing a particular contract classifier or contract classifier type. Handler tags can refer to one or more entries at the metadata 106 that include and/or reference code for executing a handler associated with the corresponding contract term 128A, 128B, 128C, 128D, 128E, 128F. The handler may execute, as described herein, to add tags to contract terms 128A, 128B, 128C, 128D, 128E, 128F. A handler tag may also include a pointer to a next contract term 128A, 128B, 128C, 128D, 128E, 128F. In this way, a chain of responsibility design pattern can be used to update the contract library data structure 120, for example, as described herein with respect to FIG. 3. In some examples, the contract library data structure 120 is represented according to the schema of the database 104 in a single table or across multiple tables.

The database management system 102, e.g., CLDS system 118 thereof, is programmed to utilize the contract library data structure 120 to generate contract form(s). For example, the user 112 and/or client application 108 makes a contract form request 114 directed to the database management system 102 (e.g., the CLDS 118 thereof). The database management system 102 generates one or more queries 132 directed to the database 104 to retrieve elements of the contract library data structure 120 and/or the metadata 106, for example, as described herein. The database 104 returns records 134 including the requested information. Using the records 134, the database management system 102 generates a contract form 117 that is provided to the client application 108 and/or user 112. In some examples, if the contract form 117 is to use a contract term that is a question, the database management system 102 sends questions and receives answers (Q/A communications 116). The contract form 117, in some examples, is based at least in part on the provided answers.

Figure 2:
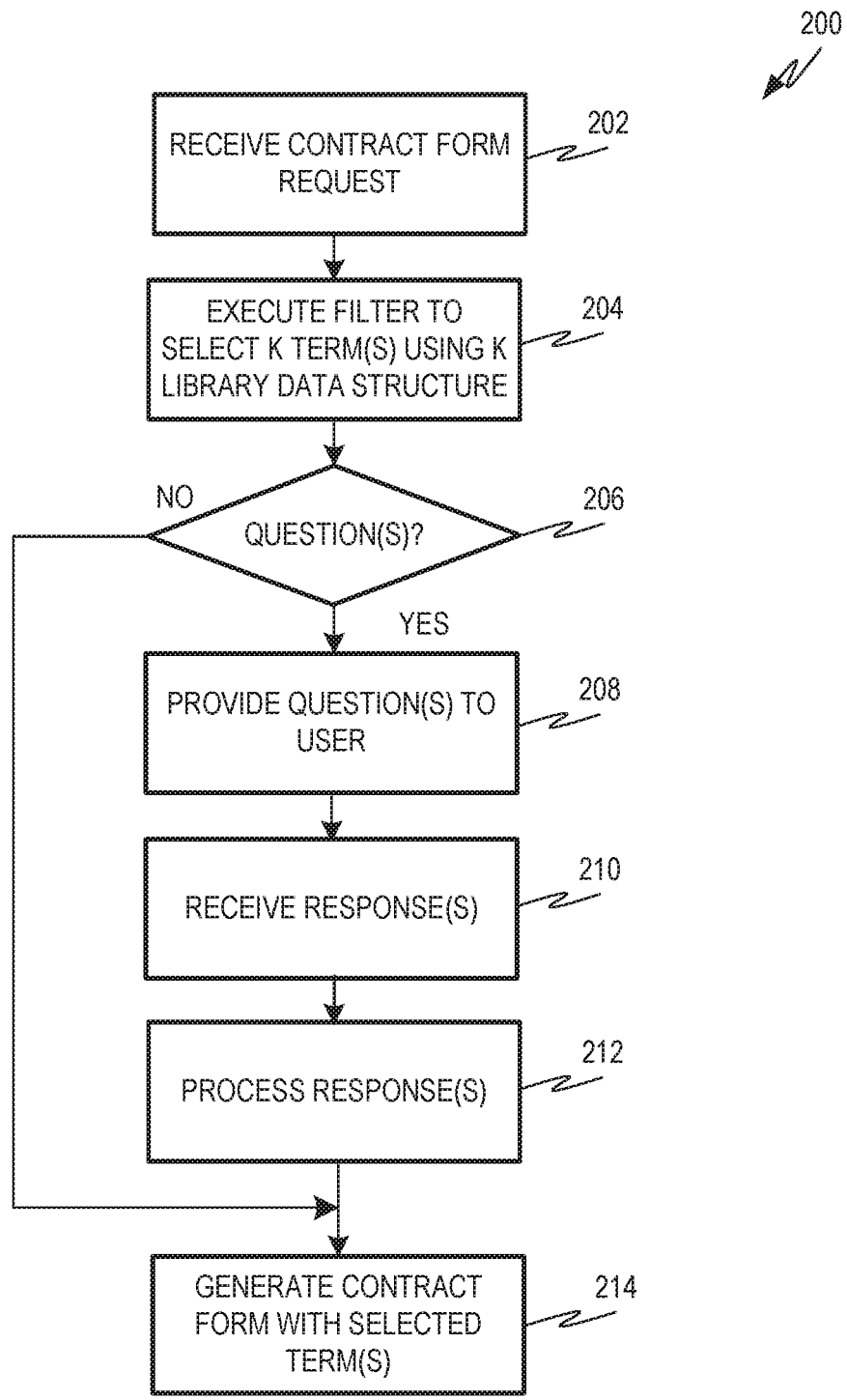
FIG. 2 is a flowchart showing one example of a process flow that may be executed by the database management system to generate a contract form using the contract library data structure.

FIG. 2 is a flowchart showing one example of a process flow 200 that may be executed by the database management system 102 (e.g., the CLDS system 118 thereof) to generate a contract form using the contract library data structure 120. At operation 202, the database management system 102 receives a request 114 for a contract form. The request includes a set of one or more contract classifiers described the desired contract form. The contract classifiers can be across one or more contract classifier types. In some examples, in addition to or instead of a receiving a request, the database management system detects a contract-related event and generates the set of contract classifiers in response, as described herein.

The contract form request 114 can originate from a user 112 via a client application 108 and/or can be automatically generated by the client application 108. For example, the client application 108 may detect a contract-related event such as, for example, a sourcing event indicating that a particular good or service is desired. Consider an example in which the client application 108 is in communication with an inventory management computer system. A sourcing event may occur when the inventory management computer system indicates that less than a threshold number or amount of any item or material is in stock. Consider another example in which the client application 108 manages insurance contracts. Another example contract-related event may occur, for example, when an insurance contract is set to expire, when a new asset needing insurance is acquired, etc. In response to a contract-related event, the database management system may retrieve a set of corresponding contract classifiers describing a contract to be generated in response to the contract-related event. The contract classifiers associated with different contract-related events may be stored at the metadata 106.

At operation 204, the database management system 102 executes a filter routine on the contract library data structure 120. The filter routine, in some examples, executes within the database management system (e.g., the CLDS system 118 thereof). The filter routine examines nodes 122, 124, 126A, 126B to identify contract terms 128A, 128B, 128C, 128D, 128E, 128F that are associated with nodes 122, 124, 126A, 126B and/or filter tags that correspond to the set of contract classifiers received with the contract form request 114. This can include, for example, identifying one or more nodes 122, 124, 126A, 126B that correspond to one or more contract classifiers received with the contract form request 114 and/or identifying one or more contract terms 128A, 128B, 128C, 128D, 128E that include filter tags corresponding to one or more contract classifiers received with the contract form request 114. The filter routine may traverse the contract library data structure 120 in any suitable order.

In some examples, the filter routine returns only contract terms associated with the exact combination of contract classifiers as the set of contract classifiers received with the contract form request 114. Consider an example contract form request 114 including a set of three contract classifiers A, B, and C. The filter routine may return only contract terms 128A, 128B, 128C, 128D, 128E, 128F that have some combination of node association or filter tagging that corresponds to A, B, and C. For example, if node 124 is associated with A, term 128A is tagged with a filter tag corresponding to B and a filter tag corresponding to C, the filter routine will return the term 128A. In other examples, the filter routine returns terms that are associated with less than all of the contract classifiers of the set of contract classifiers received with the contract form request 114.

At operation 206, the database management system 102 determines whether the contract terms returned at operation 204 include any contract terms that are questions. If there is one or more question attributes, the database management system 102 provides the questions to the client application 108 and/or user 112 via a Q/A communication 116 at operation 208. The client application 108 and/or user 112 provides a response or responses to the question or questions, for example, also via a Q/A communication 116. The response or responses are received at operation 210.

At operation 212, the database management system 102 processes the responses. For example, the database management system 102 may select one or more attribute contract terms to be added to the requested contract form based on the responses.

After processing question responses (or if the returned contract terms do not include questions), the database management system 102 generates a contract form 117 with the selected term or terms at operation 214. The contract form 117 is provided to the user 112 and/or client application 108. In some examples, the user 110 and/or client application 108 approves the contract form 117 and/or revises the contract form 117. Revisions made by the client application 108 and/or the user 112 are provided to the database management system.

Figure 3:
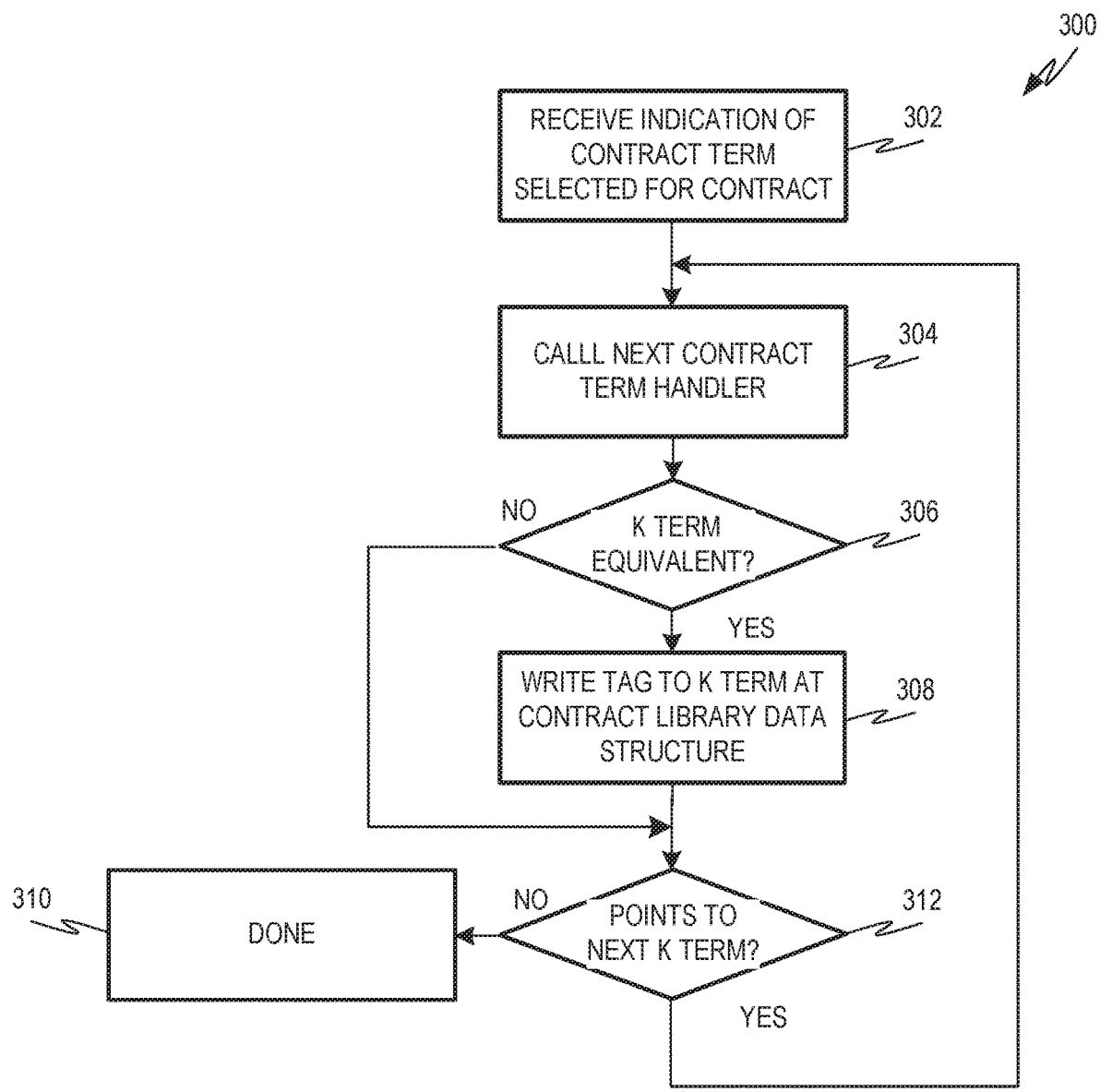
FIG. 3 is a flowchart showing one example of a process flow that may be executed by the database management system to update the contract library data structure.

FIG. 3 is a flowchart showing one example of a process flow 300 that may be executed by the database management system 102 (e.g., the CLDS system 118 thereof) to update the contract library data structure 120 using a chain of responsibility design pattern. At operation 302, the database management system 102 receives an indication of a contract term selected for a contract form, referred to herein as a selected contract term. This may occur, for example, when the user 112 and/or client application 108 approves a contract form 117 generated by the database management system 102 as described with respect to FIG. 2. In some examples, an indication that a contract term has been selected for a contract form is received with the user 112 and/or a client application 108 selects a contract term 128A, 128B, 128C, 128D, 128E, 128F without using the process flow 200 of FIG. 2, for example, by manually selecting the contract term and/or providing a new contract term. The contract form to which the contract term is selected is described by a set of one or more contract term classifiers, as described herein.

At operation 304, the database management system 102 calls a contract term handler associated with a first contract term of the contract library data structure 120. For example, the first contract term 128A, 128B, 128C, 128D, 128E, 128F may be associated with at handler tag that references the metadata 106 and also a pointer to a next contract term 128A, 128B, 128C, 128D, 128E, 128F at the contract library data structure 120. The metadata 106 may include code for and/or a reference to code for executing the relevant handler. When the handler is called, the code for the handler is executed. For example, the metadata may include data describing a dynamic tag handler class to which the called handler belongs. The metadata 106 may also include subclass data describing the particular type of the handler. In some examples, the subclass data includes the code and/or includes one or more input parameters for the code. The type of the handler may be related to the corresponding contract term 128A, 128B, 128C, 128D, 128E, 128F.

At operation 306, the executed handler determines if its associated contract term 128A, 128B, 128C, 128D, 128E, 128F is equivalent to the selected contract term. If it is, the handler writes one or more filter tags to the contract term 128A, 128B, 128C, 128D, 128E, 128F at operation 308. The written filter tag or tags indicate contract classifiers from the set of contract classifiers associated with the contract form for which the selected contract term was selected. The written filter tag or tags, in some examples, reference the metadata 106. For example, the metadata 106 may include filter tag definitions that indicate one or more contract classifiers associated with a given filter tag.

After writing filter tag or tags to the associated contract term 128A, 128B, 128C, 128D, 128E, 128F (and/or if the selected contract term is not equivalent to the handler's associated contract term 128A, 128B, 128C, 128D, 128E, 128F), the handler determines, at operation 312, if the metadata definition of its handler tag points to a next contract term 128A, 128B, 128C, 128D, 128E, 128F at the contract library data structure 120. If it does, the database management system 102 returns to operation 304 and calls the contract handler associated with the next contract term 128A, 128B, 128C, 128D, 128E, 128F. If there is no pointer, the process flow 300 may end at operation 310.

Figure 4:
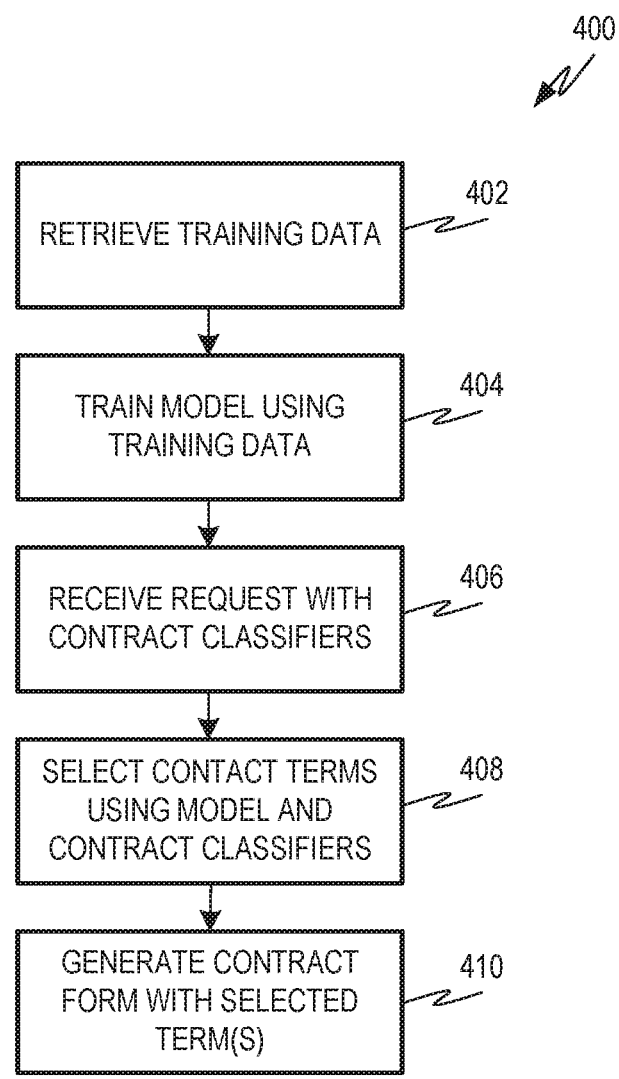
FIG. 4 is a flowchart showing an example process flow that may be executed by the database management system to generate a contract form using machine learning.

FIG. 4 is a flowchart showing an example process flow 400 that may be executed by the database management system 102 to generate a contract form using machine learning. At operation 402, the database management system 102 receives training data. The training data can be stored at the database 104. For example, the training data may utilize example contracts, including indications of the contract terms used in the various contracts and contract classifiers describing the various contracts.

At operation 404, the database management system 102 trains a model utilizing the training data. The model is trained to receive contract classifiers and generate corresponding contract terms. In some examples, the model is trained using a deep learning technique. For example, the model may be or include a decision tree model, an ensemble model, a k-nearest neighbor model, a linear regression model, a naive Bayes model, an artificial neural network, a logistic regression, or any other suitable supervised learning model.

At operation 406, the database management system receives a contract form request, such as the contract form request 114, that includes a set of contract classifiers. At operation 408, the database management system 102 selects contract terms for responding to the contract form request 114 using the generated model. This includes providing the model with the set of contract classifiers received at operation 406. In response, the model generates a set of contract terms corresponding to the set of contract classifiers. The database management system generates a contract form including the selected contract terms at operation 410. If any of the contract terms are questions, generating the contract form can include posing the questions to the user 112 and/or client application 108 and processing replies, for example, similar to what is described with respect to operation 212. The generated contract form is provided to the requesting user 112 and/or client application 108.

Figure 5:
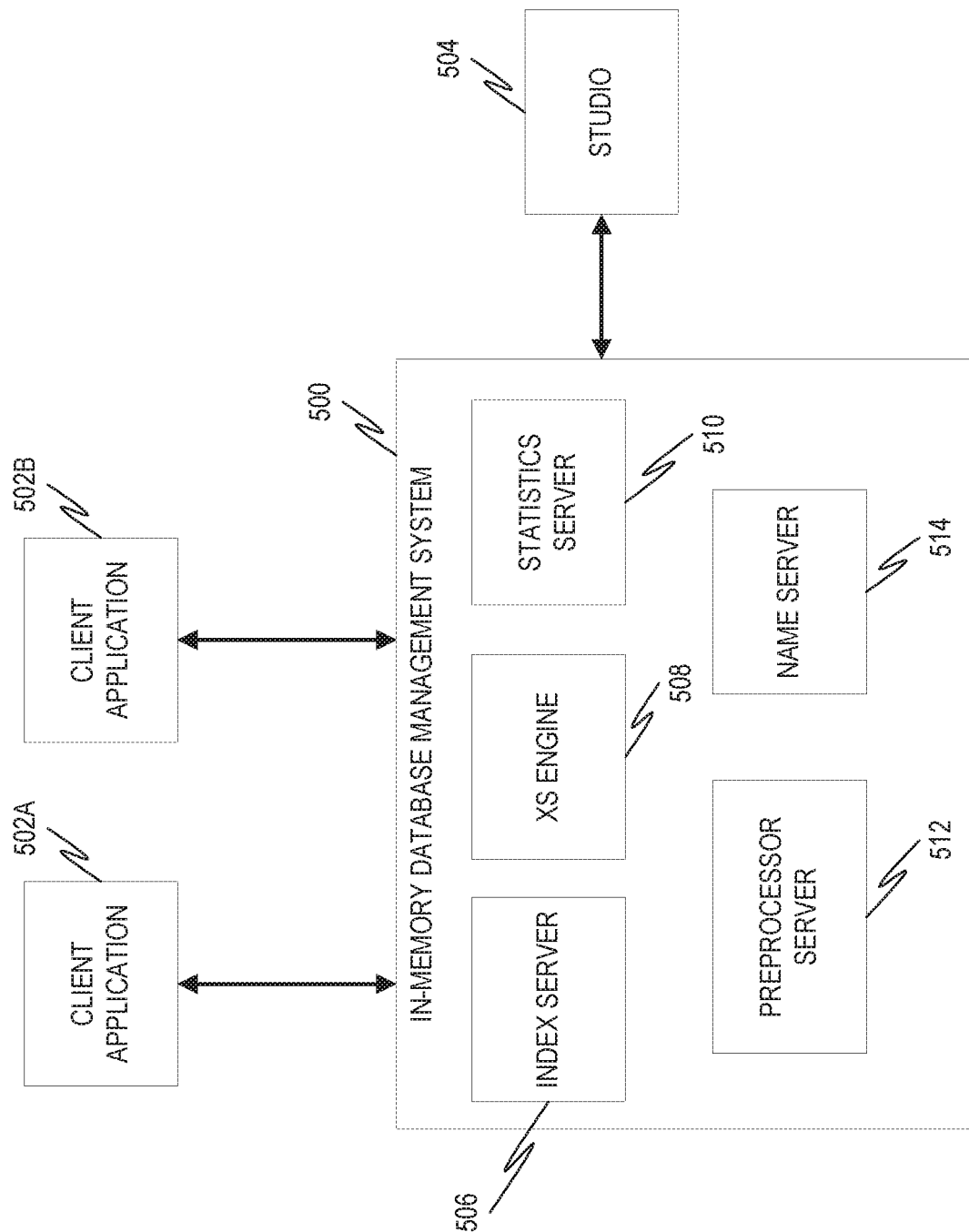
FIG. 5 is a diagram illustrating an example of in-memory database management system that may be used to implement table privilege management, for example, as described herein.

FIG. 5 is a diagram illustrating an example of an in-memory database management system 500 that may be used to implement contract library data structures, as described herein. An in-memory database stores data primarily at main memory, such as a random access memory (RAM). This is different than databases that primarily employ a disk storage mechanism. In some examples, the database management system 500 may be or include an example of the HANA system from SAP AG of Walldorf, Germany. Although various features of table privilege management are described herein in the context of an in-memory database, table privilege management may be generally performed at any suitable database management system.

The in-memory database management system 500 may be coupled to one or more client applications 502A, 502B. Client applications 502A, 502B may perform operations similar to those of the client application 108 of FIG. 1. For example, the client applications 502A, 502B may perform one or more functions utilizing data from the database (e.g., database 104) including, for example, presenting a user interface (UI) to one or more users, etc. The client applications 502A, 502B may communicate with the in-memory database management system 500 through a number of different protocols, including Structured Query Language (SQL), Multidimensional Expressions (MDX), Hypertext Transfer Protocol (HTTP), Representational State Transfer (REST), Hypertext Markup Language (HTML).

FIG. 5 also shows a studio 504 that may be used to perform modeling by accessing the in-memory database management system 500. In some examples, the studio 504 may allow complex analysis to be performed on data drawn not only from real time event data and windows, but also from stored database information.

The in-memory database management system 500 may comprise a number of different components, including an index server 506, an XS engine 508, a statistics server 510, a preprocessor server 512, and a name server 514. These components may operate on a single computing device, or may be spread among multiple computing devices (e.g., separate servers). The index server 506 contains the actual data and the engines for processing the data. It may also coordinate and uses the other servers.

The XS engine 508 allows clients to connect to the in-memory database management system 500 using web protocols, such as Hypertext Transfer Protocol (HTTP). Although the XS engine 508 is illustrated as a component of the in-memory database management system 500, in some examples, the XS engine may be implemented as one or more Application Program Interfaces (APIs) and/or services positioned between the client applications 502A, 502B and the in-memory database management system 500. In some examples, the XS engine 508 may handle client requests received in languages other than SQL such as, for example, Multidimensional Expressions (MDX), Hypertext Transfer Protocol (HTTP), Representational State Transfer (REST), Hypertext Markup Language (HTML), etc.

The statistics server 510 collects information about status, performance, and resource consumption from all the other server components. The statistics server 510 can be accessed from the studio 504 to obtain the status of various alert monitors.

The preprocessor server 512 is used for analyzing text data and extracting the information on which the text search capabilities are based.

The name server 514 holds information about the database topology. This is used in a distributed system with instances of the database on different hosts. The name server 514 knows where the components are running and which data is located on which server. In an example embodiment, a separate enqueue server may operate in the manner described above with respect to enqueue servers, specifically with regard to creating and managing light-weight enqueue sessions.

Figure 6:
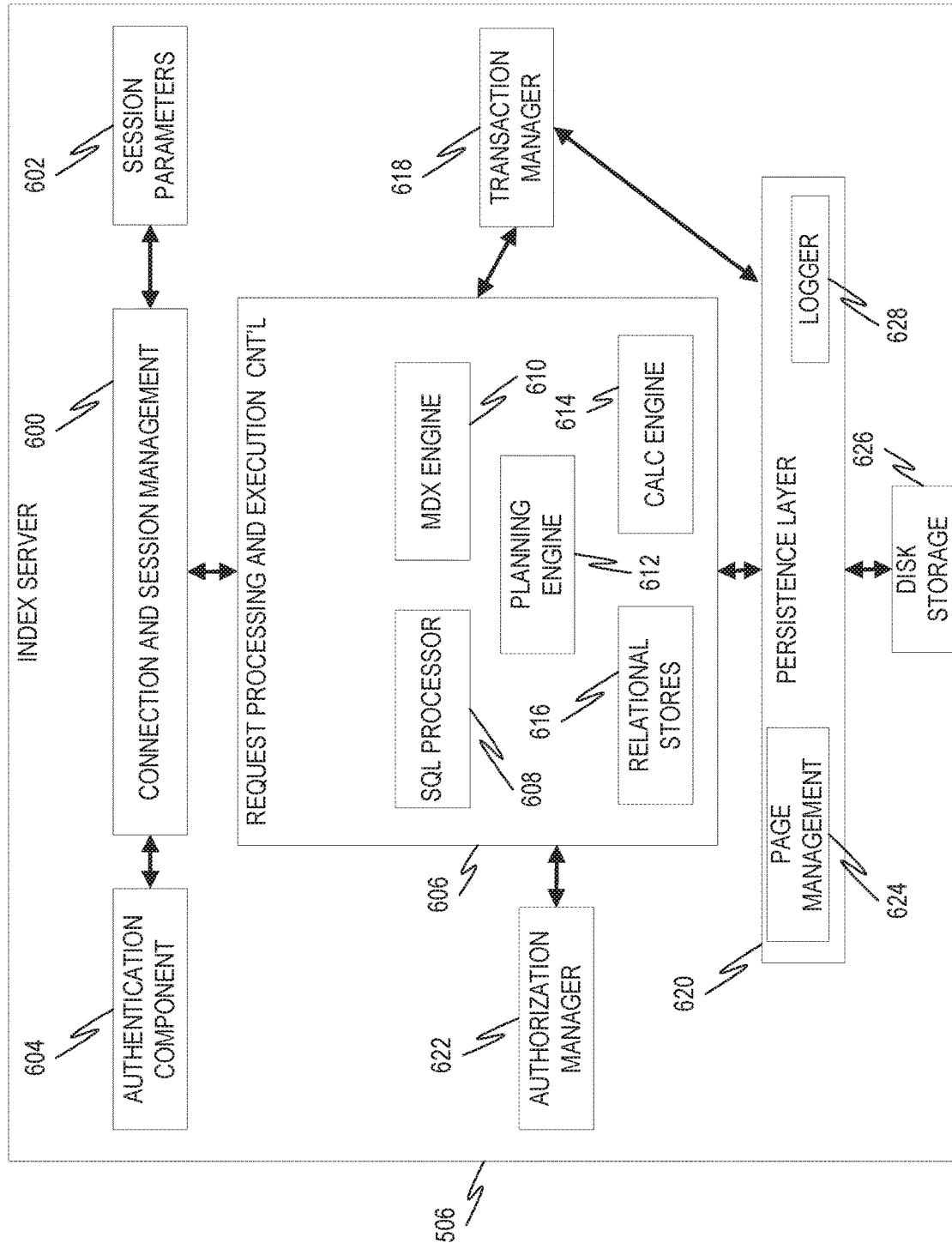
FIG. 6 is a diagram illustrating an example of an index server of the in-memory database management system of FIG. 5.

FIG. 6 is a diagram illustrating an example of the index server 506. Specifically, the index server 506 of FIG. 5 is depicted in more detail. The index server 506 includes a connection and session management component 600, which is responsible for creating and managing sessions and connections for the database clients (e.g. client applications 502A, 502B). Once a session is established, clients can communicate with the database system using SQL statements. For each session, a set of session parameters 602 may be maintained, such as auto-commit, current transaction isolation level, etc. Users (e.g., system administrators, developers) may be authenticated by the database system itself (e.g., by logging in with log-in information such as a user name and password, using an authentication component 604) or authentication can be delegated to an external authentication provider such as a Lightweight Directory Access Protocol (LDAP) directory.

Client requests, such as contract form requests, can be analyzed and executed by a set of components summarized as request processing and execution control 606. An SQL processor 608 checks the syntax and semantics of the client SQL statements and generates a logical execution plan. Multidimensional expressions (MDX) is a language for querying and manipulating multidimensional data stored in OLAP cubes. As such, an MDX engine 610 may be provided to allow for the parsing and executing of MDX commands. A planning engine 612 allows applications to execute basic planning operations in the database layer. One such operation is to create a new version of a dataset as a copy of an existing dataset, while applying filters and transformations.

A calculation engine 614 implements the various SQL script and planning operations. The calculation engine 614 creates a logical execution plan for calculation models derived from SQL script, MDX, planning, and domain-specific models. This logical execution plan may include, for example, breaking up a model into operations that can be processed in parallel. The data is stored in relational stores 616, which implement a relational database in main memory. Each SQL statement may be processed in the context of a transaction. New sessions are implicitly assigned to a new transaction. A transaction manager 618 coordinates database transactions, controls transactional isolation, and keeps track of running and closed transactions. When a transaction is committed or rolled back, the transaction manager 618 informs the involved engines about this event so they can execute needed actions. The transaction manager 618 also cooperates with a persistence layer 620 to achieve atomic and durable transactions.

An authorization manager 622 is invoked by other database system components to check whether the user has the specified privileges to execute the requested operations. The database system allows for the granting of privileges to users or roles. A privilege grants the right to perform a specified operation on a specified object.

The persistence layer 620 ensures that the database is restored to the most recent committed state after a restart and that transactions are either completely executed or completely undone. To achieve this goal in an efficient way, the persistence layer 620 uses a combination of write-ahead logs, shadow paging, and save points. The persistence layer 620 also offers a page management interface 624 for writing and reading data to a separate disk storage 626, and also contains a logger 628 that manages the transaction log. Log entries can be written implicitly by the persistence layer 620 when data is written via the persistence interface or explicitly by using a log interface.

Figure 7:
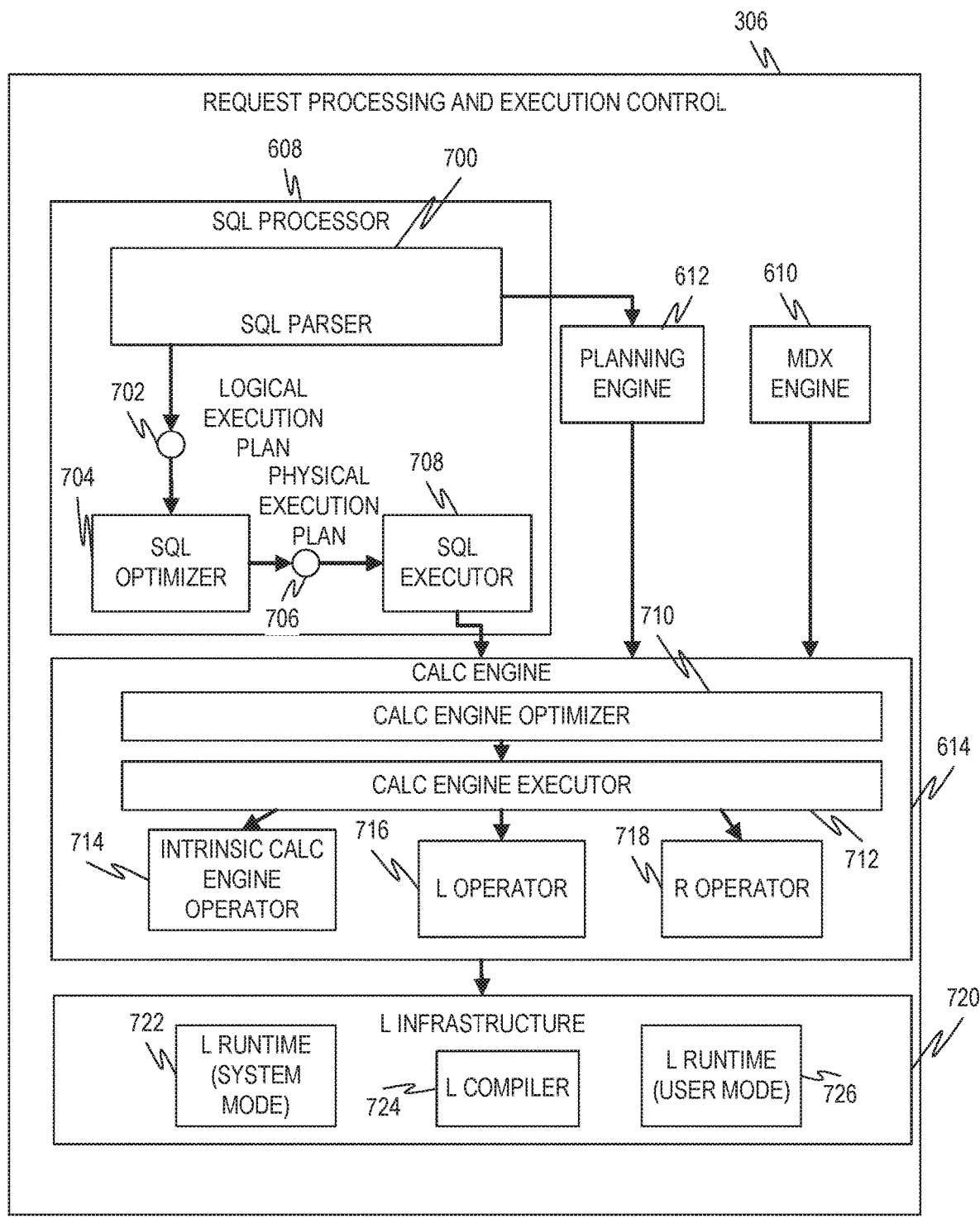
FIG. 7 is a diagram illustrating one example of the request processing and execution control of the database management system of FIG. 5.

FIG. 7 is a diagram illustrating one example of the request processing and execution control 606. This diagram depicts the request processing and execution control 606 of FIG. 6 in more detail. The SQL processor 608 contains an SQL parser 700, which parses the SQL statement and generates a logical execution plan 702, which it passes to an SQL optimizer 704. The SQL optimizer 704 optimizes the logical execution plan 702 and converts it to a physical execution plan 706, which it then passes to a SQL executor 708. The calculation engine 614 implements the various SQL script and planning operations, and includes a calc engine optimizer 710, which optimizes the operations, and a calc engine executor 712, which executes the operations, as well as an intrinsic calc engine operator 714, an L operator 716, and an R operator 718.

An L infrastructure 720 includes a number of components to aid in the running of L procedures, including an L-runtime (system mode) 722, an L compiler 724, and an L-runtime (User mode) 726.

EXAMPLES

Example 1 is a computer-implemented system for generating a contract form using a contract library data structure, the computer-implemented system comprising: at least one hardware processor; a machine-readable medium comprising instructions thereon that, when executed by the at least one hardware processor, cause the at least one hardware processor to perform operations comprising: receiving, from a user, a contract form request comprising a set of contract classifiers; accessing a contract library data structure, the contract library data structure comprising: a plurality of nodes, a first node of the plurality of nodes corresponding to a first contract classifier of a first classifier type and a second node of the plurality of nodes corresponding to a second contract classifier of the first classifier type; the first node associated with a first contract term and a second contract term; the second node associated with a third contract term and a fourth contract term; the first contract term associated with: a first contract term handler tag referencing a first contract term handler, and a first contract term filter tag describing a first contract classifier of a second contract classifier type; the second contract term associated with a second contract term handler tag referencing a second contract term handler, and a second contract term filter tag describing a second contract classifier of the second contract classifier type, the second contract term handler tag comprising a pointer to the first contract term; executing a filter routine to traverse the contract library data structure to identify at least one contract term associated with one or more filter tags corresponding to the set of contract classifiers, the filter routine returning an indication of the first contract term associated with the first node; and generating a contract form comprising the first contract term.

In Example 2, the subject matter of Example 1 optionally includes the operations further comprising: receiving an indication of a selected contract term to be included in a contract form; and calling the second contract term handler, wherein the second contract term handler is programmed to perform operations comprising: determining that the second contract term is not equivalent to the selected contract term; and calling the first contract term handler based at least in part on the pointer to the to the first contract term, the first contract term handler programmed to perform operations comprising: determining that the first contract term is equivalent to the selected contract term; and adding at least one contract term filter tag to the first contract term in the contract library data structure, the at least one filter tag describing the contract form.

In Example 3, the subject matter of Example 2 optionally includes wherein the calling of the second contract term handler is performed by a third contract term handler associated with the third contract term, wherein the third contract term handler comprises a pointer to the second contract term.

In Example 4, the subject matter of any one or more of Examples 2-3 optionally includes wherein calling the first contract term handler comprises: accessing the pointer to the first contract term from the second contract term handler tag; and accessing metadata describing the first contract term handler, the metadata referenced by the first contract term handler tag.

In Example 5, the subject matter of any one or more of Examples 1-4 optionally includes wherein the set of contract classifiers comprises a received contract classier of the first classifier type and a received contract classifier of a second classifier type.

In Example 6, the subject matter of any one or more of Examples 1-5 optionally includes wherein the second node is a child node of the first node.

In Example 7, the subject matter of any one or more of Examples 1-6 optionally includes the operations further comprising: receiving an indication of a first contract-related event; and retrieving at least a portion of the set of contract classifiers from a metadata entry associated with the first contract-related event.

In Example 8, the subject matter of any one or more of Examples 1-7 optionally includes wherein the set of contract classifiers are selected from the group consisting of a contract type, a jurisdiction, a department of a business entity, a contract party, or a purchased item.

In Example 9, the subject matter of any one or more of Examples 1-8 optionally includes wherein the first contract term comprises a question, the operations further comprising: providing the question to the user; receiving, from the user, a response to the question; and storing the response in association with the first contract term at the contract library data structure.

Example 10 is a computer-implemented method for generating a contract form using a contract library data structure, the method comprising: receiving, from a user, a contract form request comprising a set of contract classifiers; accessing a contract library data structure, the contract library data structure comprising: a plurality of nodes, a first node of the plurality of nodes corresponding to a first contract classifier of a first classifier type and a second node of the plurality of nodes corresponding to a second contract classifier of the first classifier type; the first node associated with a first contract term and a second contract term; the second node associated with a third contract term and a fourth contract term; the first contract term associated with: a first contract term handler tag referencing a first contract term handler, and a first contract term filter tag describing a first contract classifier of a second contract classifier type; the second contract term associated with a second contract term handler tag referencing a second contract term handler, and a second contract term filter tag describing a second contract classifier of the second contract classifier type, the second contract term handler tag comprising a pointer to the first contract term; executing a filter routine to traverse the contract library data structure to identify at least one contract term associated with one or more filter tags corresponding to the set of contract classifiers, the filter routine returning an indication of the first contract term associated with the first node; and generating a contract form comprising the first contract term.

In Example 11, the subject matter of Example 10 optionally includes receiving an indication of a selected contract term to be included in a contract form; and calling the second contract term handler, wherein the second contract term handler is programmed to perform operations comprising: determining that the second contract term is not equivalent to the selected contract term; and calling the first contract term handler based at least in part on the pointer to the to the first contract term, the first contract term handler programmed to perform operations comprising: determining that the first contract term is equivalent to the selected contract term; and adding at least one contract term filter tag to the first contract term in the contract library data structure, the at least one filter tag describing the contract form.

In Example 12, the subject matter of Example 11 optionally includes wherein the calling of the second contract term handler is performed by a third contract term handler associated with the third contract term, wherein the third contract term handler comprises a pointer to the second contract term.

In Example 13, the subject matter of any one or more of Examples 11-12 optionally includes wherein calling the first contract term handler comprises: accessing the pointer to the first contract term from the second contract term handler tag; and accessing metadata describing the first contract term handler, the metadata referenced by the first contract term handler tag.

In Example 14, the subject matter of any one or more of Examples 10-13 optionally includes wherein the set of contract classifiers comprises a received contract classier of the first classifier type and a received contract classifier of a second classifier type.

In Example 15, the subject matter of any one or more of Examples 10-14 optionally includes wherein the second node is a child node of the first node.

In Example 16, the subject matter of any one or more of Examples 10-15 optionally includes receiving an indication of a first contract-related event; and retrieving at least a portion of the set of contract classifiers from a metadata entry associated with the first contract-related event.

In Example 17, the subject matter of any one or more of Examples 10-16 optionally includes wherein the set of contract classifiers are selected from the group consisting of a contract type, a jurisdiction, a department of a business entity, a contract party, or a purchased item.

In Example 18, the subject matter of any one or more of Examples 10-17 optionally includes wherein the first contract term comprises a question, further comprising: providing the question to the user; receiving, from the user, a response to the question; and storing the response in association with the first contract term at the contract library data structure.

Example 19 is a machine-readable medium comprising instructions thereon that, when executed by the at least one hardware processor, cause the at least one hardware processor to perform operations comprising: receiving, from a user, a contract form request comprising a set of contract classifiers; accessing a contract library data structure, the contract library data structure comprising: a plurality of nodes, a first node of the plurality of nodes corresponding to a first contract classifier of a first classifier type and a second node of the plurality of nodes corresponding to a second contract classifier of the first classifier type; the first node associated with a first contract term and a second contract term; the second node associated with a third contract term and a fourth contract term; the first contract term associated with: a first contract term handler tag referencing a first contract term handler, and a first contract term filter tag describing a first contract classifier of a second contract classifier type; the second contract term associated with a second contract term handler tag referencing a second contract term handler, and a second contract term filter tag describing a second contract classifier of the second contract classifier type, the second contract term handler tag comprising a pointer to the first contract term; executing a filter routine to traverse the contract library data structure to identify at least one contract term associated with one or more filter tags corresponding to the set of contract classifiers, the filter routine returning an indication of the first contract term associated with the first node; and generating a contract form comprising the first contract term.

In Example 20, the subject matter of Example 19 optionally includes the operations further comprising: receiving an indication of a selected contract term to be included in a contract form; and calling the second contract term handler, wherein the second contract term handler is programmed to perform operations comprising: determining that the second contract term is not equivalent to the selected contract term; and calling the first contract term handler based at least in part on the pointer to the to the first contract term, the first contract term handler programmed to perform operations comprising: determining that the first contract term is equivalent to the selected contract term; and adding at least one contract term filter tag to the first contract term in the contract library data structure, the at least one filter tag describing the contract form.

Figure 8:
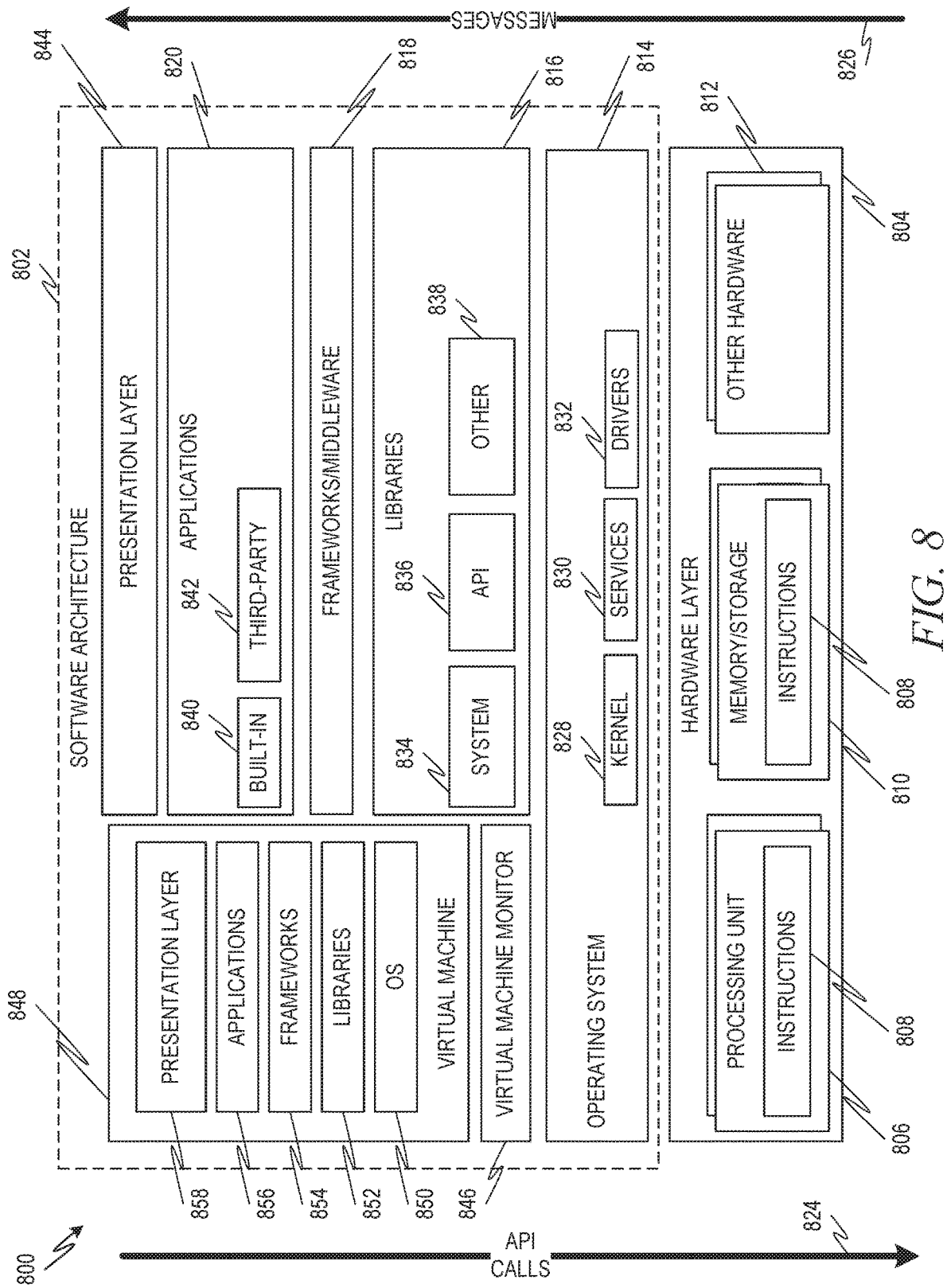
FIG. 8 is a block diagram showing one example of a software architecture for a computing device.

FIG. 8 is a block diagram 800 showing one example of a software architecture 802 for a computing device. The architecture 802 may be used in conjunction with various hardware architectures, for example, as described herein. FIG. 8 is merely a non-limiting example of a software architecture and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system of FIG. 8.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 which represents any other hardware of the hardware layer 804, such as the other hardware illustrated as part of the architecture 800.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820 and presentation layer 844. Operationally, the applications 820 and/or other components within the layers may invoke application programming interface (API) calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system 834 libraries (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 10D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 and/or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 includes built-in applications 840 and/or third party applications 842. Examples of representative built-in applications 840 may include, but are not limited to, a contacts application, a browser application, a book reader application, a location application, a media application, a messaging application, and/or a game application. Third party applications 842 may include any of the built in applications as well as a broad assortment of other applications. In a specific example, the third party application 842 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third party application 842 may invoke the API calls 824 provided by the mobile operating system such as operating system 814 to facilitate functionality described herein.

The applications 820 may utilize built in operating system functions (e.g., kernel 828, services 830 and/or drivers 832), libraries (e.g., system 834, APIs 836, and other libraries 838), frameworks/middleware 818 to create user interfaces to interact with users of the system. Alternatively, or additionally, in some systems interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine as well as the interface with the host operating system (i.e., operating system 814). A software architecture executes within the virtual machine such as an operating system 850, libraries 852, frameworks/middleware 854, applications 856 and/or presentation layer 858. These layers of software architecture executing within the virtual machine 848 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 9:
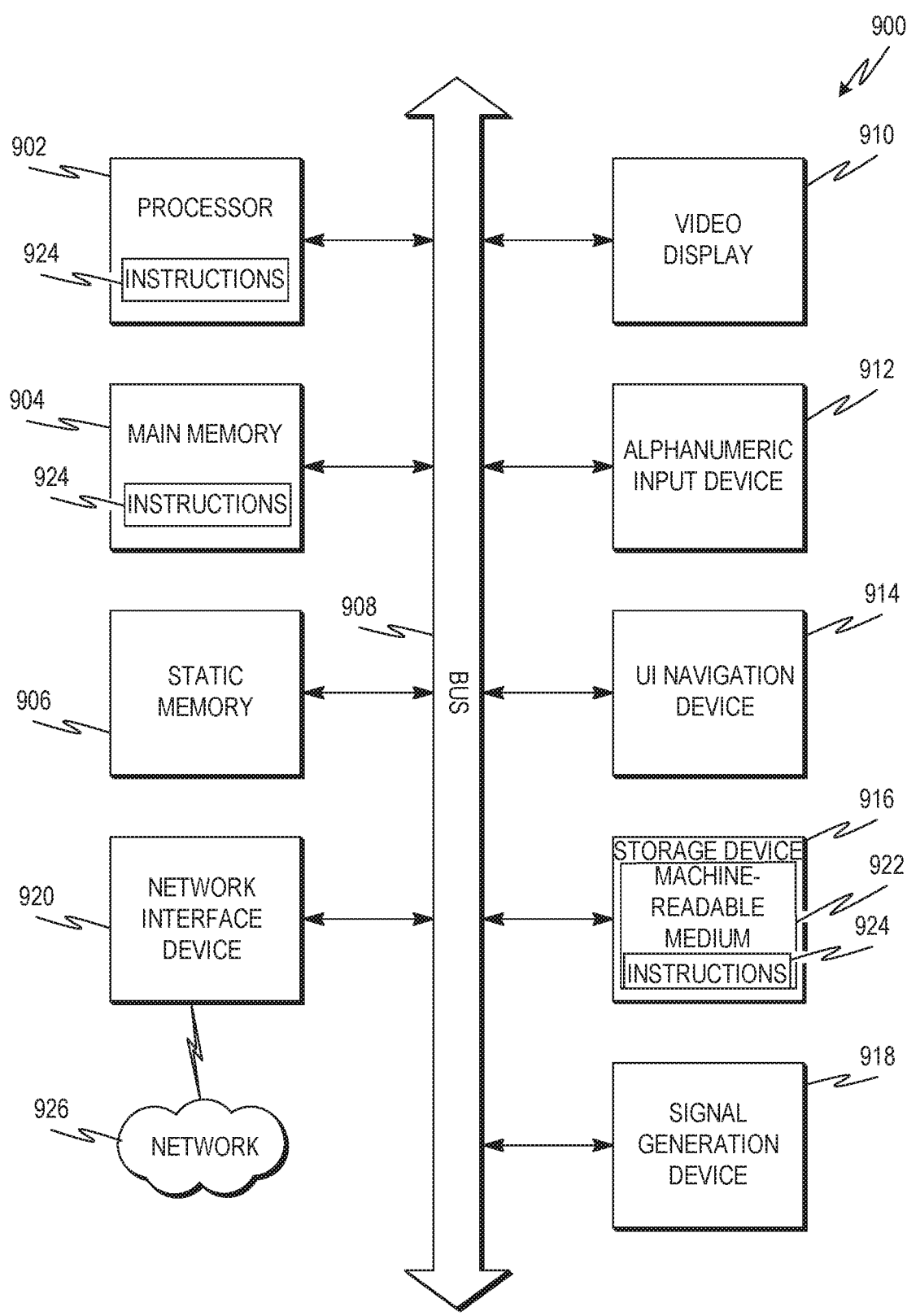
FIG. 9 is a block diagram of a machine in the example form of a computer system within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation (or cursor control) device 914 (e.g., a mouse), a disk drive unit 916, a signal generation device 918 (e.g., a speaker and a network interface device 920.

Machine-Readable Medium

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media 922.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e,g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented system for generating a contract form using a contract library data structure, the computer-implemented system comprising:
   at least one hardware processor;
   a machine-readable medium comprising instructions thereon that, when executed by the at least one hardware processor, cause the at least one hardware processor to perform operations comprising:
   receiving, by an application executing at the at least one hardware processor and from a user computing device, a contract form request comprising a set of contract classifiers;
   accessing, by the application, the contract library data structure, the contract library data structure comprising:
      a plurality of nodes, a first node of the plurality of nodes corresponding to a first contract classifier of a first classifier type and a second node of the plurality of nodes corresponding to a second contract classifier of the first classifier type;
      the first node associated with a first contract term and a second contract term;
      the second node associated with a third contract term and a fourth contract term;
      the first contract term associated with: a first contract term handler tag referencing a first contract term handler executable, and a first contract term filter tag describing the first contract classifier of a second contract classifier type;
      the second contract term associated with a second contract term handler tag referencing a second contract term handler executable, and a second contract term filter tag describing the second contract classifier of the second contract classifier type, the second contract term handler tag comprising a pointer to the first contract term;
   executing a filter routine to traverse the contract library data structure to identify at least one contract term associated with one or more filter tags corresponding to the set of contract classifiers, the filter routine returning an indication of the first contract term associated with the first node;

generating a contract form comprising the first contract term;

receiving, by the application, an indication of a selected contract term to be included in the contract form;

calling, by the application, the second contract term handler executable, wherein the second contract term handler executable is programmed to perform operations comprising:

determining that the second contract term is not equivalent to the selected contract term; and calling the first contract term handler executable based at least in part on the pointer to the first contract term, the first contract term handler executable programmed to perform operations comprising:

determining that the first contract term is equivalent to the selected contract term; and adding at least one contract term filter tag to the first contract term in the contract library data structure, the at least one contract term filter tag describing the contract form.

2. The computer-implemented system of claim 1, wherein the calling of the second contract term handler executable is performed by a third contract term handler executable associated with the third contract term, wherein the third contract term handler executable comprises a pointer to the second contract term.

3. The computer-implemented system of claim 1, wherein calling the first contract term handler executable comprises: accessing the pointer to the first contract term from the second contract term handler tag; and accessing metadata describing the first contract term handler executable, the metadata referenced by the first contract term handler tag.

4. The computer-implemented system of claim 1, wherein the set of contract classifiers comprises a received contract classier of the first classifier type and a received contract classifier of a second classifier type.

5. The computer-implemented system of claim 1, wherein the second node is a child node of the first node.

6. The computer-implemented system of claim 1, the operations further comprising: receiving an indication of a first contract-related event; retrieving at least a portion of the set of contract classifiers from a metadata entry associated with the first contract-related event.

7. The computer-implemented system of claim 1, wherein the set of contract classifiers is selected from a group consisting of a contract type, a jurisdiction, a department of a business entity, a contract party, or a purchased item.

8. The computer-implemented system of claim 1, wherein the first contract term comprises a question, the operations further comprising: providing the question to the user computing device; receiving, from the user computing device, a response to the question; and storing the response in association with the first contract term at the contract library data structure.

9. A computer-implemented method for generating a contract form using a contract library data structure, the method comprising:

receiving, by an application executing at the at least one hardware processor and from a user computing device, a contract form request comprising a set of contract classifiers;

accessing, by the application, the contract library data structure, the contract library data structure comprising: a plurality of nodes, a first node of the plurality of nodes corresponding to a first contract classifier of a first classifier type and a second node of the plurality of nodes corresponding to a second contract classifier of the first classifier type;

the first node associated with a first contract term and a second contract term;

the second node associated with a third contract term and a fourth contract term;

the first contract term associated with: a first contract term handler tag referencing a first contract term handler executable, and a first contract term filter tag describing the first contract classifier of a second contract classifier type;

the second contract term associated with a second contract term handler tag referencing a second contract term handler executable, and a second contract term filter tag describing the second contract classifier of the second contract classifier type, the second contract term handler tag comprising a pointer to the first contract term;

executing a filter routine to traverse the contract library data structure to identify at least one contract term associated with one or more filter tags corresponding to the set of contract classifiers, the filter routine returning an indication of the first contract term associated with the first node;

generating a contract form comprising the first contract term;

receiving, by the application, an indication of a selected contract term to be included in the contract form;

calling, by the application, the second contract term handler executable, wherein the second contract term handler executable is programmed to perform operations comprising:

determining that the second contract term is not equivalent to the selected contract term; and calling the first contract term handler executable based at least in part on the pointer to the first contract term, the first contract term handler executable programmed to perform operations comprising:

determining that the first contract term is equivalent to the selected contract term; and adding at least one contract term filter tag to the first contract term in the contract library data structure, the at least one contract term filter tag describing the contract form.

10. The computer-implemented method of claim 9, wherein the calling of the second contract term handler executable is performed by a third contract term handler executable associated with the third contract term, wherein the third contract term handler executable comprises a pointer to the second contract term.

11. The computer-implemented method of claim 9, wherein calling the first contract term handler executable comprises: accessing the pointer to the first contract term from the second contract term handler tag; and accessing metadata describing the first contract term handler executable, the metadata referenced by the first contract term handler tag.

12. The computer-implemented method of claim 9, wherein the set of contract classifiers comprises a received contract classier of the first classifier type and a received contract classifier of a second classifier type.

13. The computer-implemented method of claim 9, wherein the second node is a child node of the first node.

14. The computer-implemented method of claim 9, further comprising:

receiving an indication of a first contract-related event; retrieving at least a portion of the set of contract classifiers from a metadata entry associated with the first contract-related event.

15. The computer-implemented method of claim 9, wherein the set of contract classifiers is selected from a group consisting of a contract type, a jurisdiction, a department of a business entity, a contract party, or a purchased item.

16. The computer-implemented method of claim 9, wherein the first contract term comprises a question, further comprising: providing the question to the user computing device; receiving, from the user computing device, a response to the question; and storing the response in association with the first contract term at the contract library data structure.

17. A non-transitory machine-readable medium comprising instructions thereon that, when executed by at least one hardware processor, cause the at least one hardware processor to perform operations comprising:
receiving, by an application executing at the at least one hardware processor and from a user computing device, a contract form request comprising a set of contract classifiers;
accessing, by the application, a contract library data structure, the contract library data structure comprising:
a plurality of nodes, a first node of the plurality of nodes corresponding to a first contract classifier of a first classifier type and a second node of the plurality of nodes corresponding to a second contract classifier of the first classifier type;
the first node associated with a first contract term and a second contract term;
the second node associated with a third contract term and a fourth contract term;
the first contract term associated with: a first contract term handler tag referencing a first contract term handler executable, and a first contract term filter tag describing the first contract classifier of a second contract classifier type;
the second contract term associated with a second contract term handler tag referencing a second contract term handler executable, and a second contract term filter tag describing the second contract classifier of the second contract classifier type, the second contract term handler tag comprising a pointer to the first contract term;

executing a filter routine to traverse the contract library data structure to identify at least one contract term associated with one or more filter tags corresponding to the set of contract classifiers, the filter routine returning an indication of the first contract term associated with the first node;
generating a contract form comprising the first contract term;
receiving, by the application, an indication of a selected contract term to be included in the contract form;
calling, by the application, the second contract term handler executable, wherein the second contract term handler executable is programmed to perform operations comprising:
determining that the second contract term is not equivalent to the selected contract term; and
calling the first contract term handler executable based at least in part on the pointer to the first contract term, the first contract term handler executable programmed to perform operations comprising:
determining that the first contract term is equivalent to the selected contract term; and
adding at least one contract term filter tag to the first contract term in the contract library data structure, the at least one contract term filter tag describing the contract form.

18. The non-transitory machine-readable medium of claim 17, wherein the calling of the second contract term handler executable is performed by a third contract term handler executable associated with the third contract term, wherein the third contract term handler executable comprises a pointer to the second contract term.

19. The non-transitory machine-readable medium of claim 17, wherein calling the first contract term handler executable comprises: accessing the pointer to the first contract term from the second contract term handler tag; and accessing metadata describing the first contract term handler executable, the metadata referenced by the first contract term handler tag.

20. The non-transitory machine-readable medium of claim 17, wherein the set of contract classifiers comprises a received contract classier of the first classifier type and a received contract classifier of a second classifier type.

* * * * *